US005746496A

United States Patent [19]

Weigelt et al.

[11] Patent Number: 5,746,496

[45] Date of Patent: May 5, 1998

[54] BLINK LAMP

[75] Inventors: Beate Weigelt; Martin Mügge; Detlef Decker, all of Lippstadt, Germany

[73] Assignee: Hella KG Hueck & Co., Lippstadt, Germany

[21] Appl. No.: 383,369

[22] Filed: Feb. 3, 1995

[30] Foreign Application Priority Data

Feb. 25, 1994 [DE] Germany .......................... 44 06 183.8

[51] Int. Cl.$^6$ .................................................. B60Q 1/02

[52] U.S. Cl. .......................... 362/61; 362/83.3; 362/297

[58] Field of Search .............................. 362/61, 80, 83.3, 362/297, 346, 311

[56] References Cited

U.S. PATENT DOCUMENTS 1,559,930 11/1925 Bean .......................................... 362/61
5,552,969 9/1996 Murakami .................................. 362/61

FOREIGN PATENT DOCUMENTS 2 214 161 9/1973 Germany .
29 39 273 A1 4/1981 Germany .
30 05 883 A1 10/1981 Germany .
32 08 741 A1 9/1983 Germany .
32 39 754 A1 5/1984 Germany .
41 24 373 A1 1/1993 Germany .
88201 4/1991 Japan ..................................... 362/297

*Primary Examiner*—Y My Quach
*Attorney, Agent, or Firm*—Griffin, Butler Whisenhunt & Kurtossy

[57] ABSTRACT

A blink lamp for a motor vehicle, which is arranged at a corner area of a vehicle, has a reflector with an outer first reflector portion (R1) and an inner second reflector portion (R2), a light source (L) whose socket is arranged between the first and second reflector portions, and a light-transmissive shield (S) covering a facing side of the lamp and extending substantially rearward along a side area of the vehicle. In order to provide a maximized light output from the first and second reflector portions the first and second reflector portions are formed together as one piece with their reflector surfaces running together continuously; a projection of the inner second reflector portion in a driving direction is at least as large as a projection of the outer first reflector portion; the surfaces of both the first and second reflector portions are formed so that a light reflection direction continuously changes as a function of changes in geometric positions on the reflector surface; and both the first and second reflector portions create substantially the same light distribution, with both the first and second reflector portions, in both horizontal and vertical cross sectional directions, or planes, having a light scattering reflective characteristic corresponding to a light distribution to be achieved.

14 Claims, 5 Drawing Sheets

FIG.8

Horizontal angle

| Vertical angle | 30° | 20° | 10° | 5° | 0° | 5° | 10° | 20° | 30° |
|---|---|---|---|---|---|---|---|---|---|
| 15° | | | | | | | | | |
| 10° | | | | 20 | 15 | 20 | | | |
| 5° | | 10 | 20 | 50 | 70 | 50 | 20 | 10 | |
| 0° | | 10 | 35 | 90 | 100 | 90 | 35 | 10 | |
| 5° | | 10 | 20 | 50 | 70 | 50 | 20 | 10 | |
| 10° | | | | 20 | 15 | 20 | | | |
| 15° | | | | | | | | | |

Numerical values in %

BLINK LAMP

BACKGROUND OF THE INVENTION

This invention concerns a blink lamp (or turn signal type lamp) for motor vehicles, of the type which is arranged at corner areas of vehicles, having a reflector with an outer first reflector portion and an inner second reflector portion, having a light source whose socket is arranged between the first and second reflector portions and having a light-transmissive shield covering an outwardly-facing side of the lamp and extending substantially rearwardly along a side area of the vehicle whereby a free edge of the outer first reflector portion is bounded, or bordered, by the light-transmissive shield.

A blink lamp for motor vehicles is disclosed in German Offenlegungsschrift DE 32 08 741 A1 which is suitable as a front blink lamp for installation at an edge, or corner, area of a motor vehicle. This lamp has a light-transmissive shield extending substantially rearwardly along a side area of the vehicle. This light-transmissive shield encloses a housing of an outwardly-facing side of the blink lamp. The blink lamp also has a reflector with an outer first reflector portion and an inner second reflector portion. Further, the blink lamp has a light source whose socket is arranged between the reflector portions. A free edge of the outer first reflector portion is bounded by the light-transmissive shield.

The same features are disclosed in German Offenlegungsschrift DE 22 14 161. This blink lamp also has a sidewardly arranged rear illumination, or reflector, optic. In both known embodiments it has been proven to be disadvantageous that the two reflector portions each respectively forms a parabola, whereby, upon reflection of light beams from the light source, a substantially parallel light beam bundle is created and the light-transmissive shield must thereby have the necessary optical elements for producing the necessary light-distribution light scattering. Further, it proves to be disadvantageous that in the known embodiments both reflector portions do not, or only partially do, create the same light distribution whereby they do not optimally use the light which is at their disposal. Further it is disadvantageous that both reflector portions are not formed as one piece and that the surfaces of the reflector portions do not run together continuously, which, for one thing, reduces light output and which, for another thing, makes manufacture of the blink lamps cost intensive. Still further, it proves to be disadvantageous that in the prior art embodiments the light-transmissive shields have light scattering optical mediums whereby, particularly for blink lamps directly adjacent headlights, a visual non-uniform appearance is created.

It is an object of this invention to provide a blink lamp of the type described in the opening paragraph above which has two reflector portions which, by means of light intensities created by the reflector portions, provides a maximized light output.

SUMMARY OF THE INVENTION

According to principles of this invention: the reflector portions are formed together as one piece with their reflector surfaces running together continuously; a projected surface of the inner second reflector portion in a driving direction is at least as large as a projected surface of the outer first reflector portion; the surfaces of each the first and second reflector portions are formed so that a light reflected direction continuously changes as a function of a geometric position on the surface; and both the first and second reflector portions create substantially the same light distribution, with each of both the first and second reflector portions, in both horizontal as well as vertical cross sectional directions, having a light scattering reflective characteristic corresponding to a light distribution to be achieved.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 8 is a diagram of an average light distribution of a blink lamp of this invention.

DESCRIPTION OF THE PREFERRED EMBODIMENT

Figure 1:
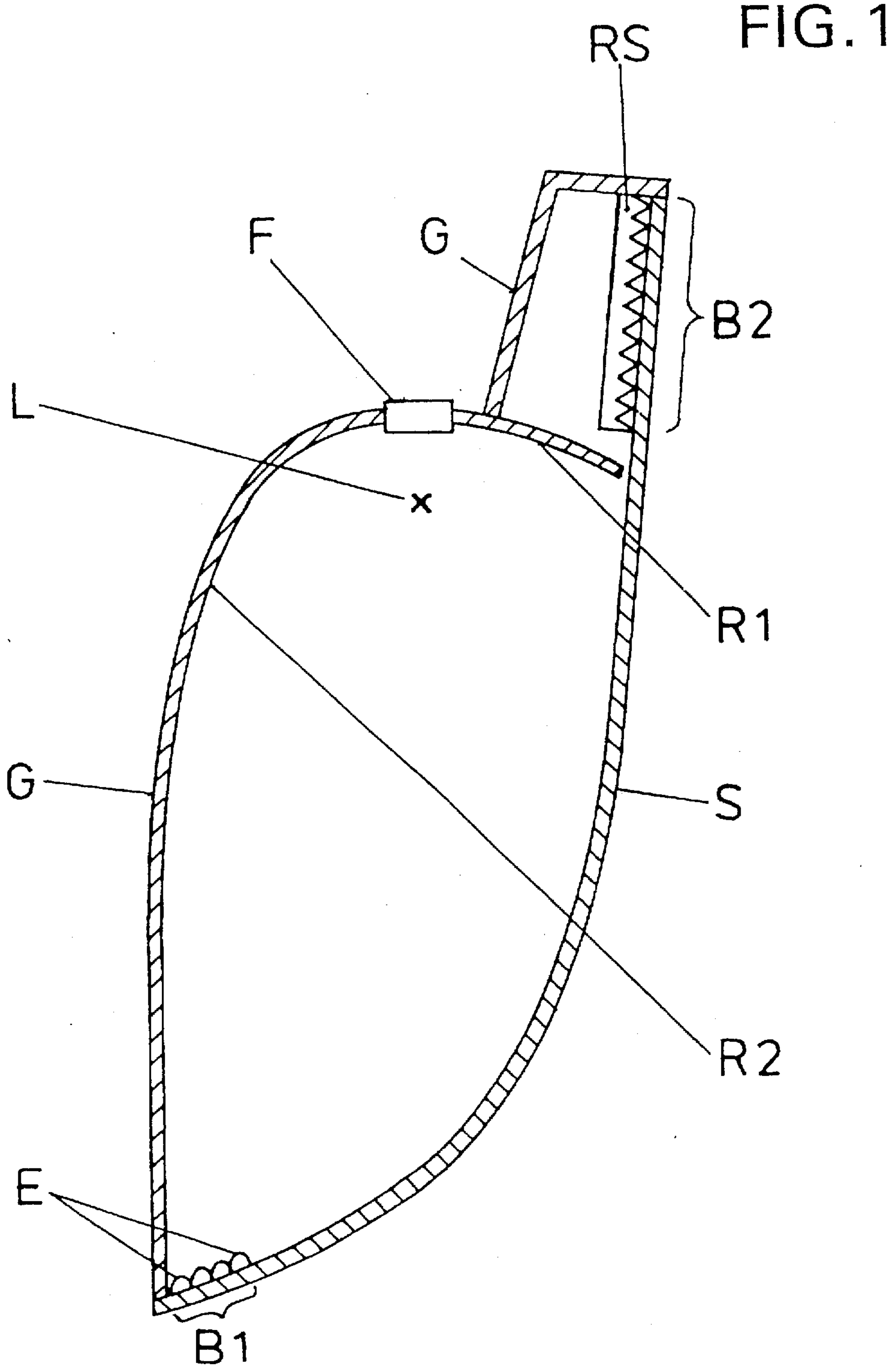
FIG. 1 is a schematic cross sectional view of a blink lamp of this invention, with a light source L being shown schematically thereon.

FIG. 1 is a schematic view of a construction of a blink lamp according to this invention. The blink lamp is shown in horizontal cross section. The blink lamp has a housing G which is enclosed by a light-transmissive shield S. The blink lamp is suitable for being installed at an edge, or corner, area of a vehicle. The installation can be in a front area as well as at a rear area of the vehicle. The light-transmissive shield extends, in an installed condition of the blink lamp, substantially rearwardly along a side area of the vehicle. The blink lamp has a light source L whose filament position is shown schematically in FIG. 1. The light source L is held in the housing G by a socket F, with the socket F being arranged between an outer first reflector portion R1 and an inner second reflector portion R2. A free edge of the outer first reflector portion R1 is bordered, or bounded, by the light-transmissive shield S. Both reflector portions R1, R2 can be formed as part of the housing whereby a cost-effective manufacturing of the blink lamp is made possible. Both reflector portions R1, R2 are formed together as one piece and the surfaces of the reflector portions R1, R2 run flush together continuously so as to form a continuous surface.

The surfaces of both of the reflector portions R1, R2 are formed such that the reflection directions of light beams from the light source continually vary as a function of changes in the geometric position (moving from one point on the surface of the reflector to another point on the surface of the reflector) on the surfaces of the reflector portions from which they are reflected. Both reflector portions R1, R2 thereby create the same light distribution for an optimal light to enhance light intensity, whereby both reflector portions, in both horizontal and vertical cross-sectional directions have a light scattering characteristic, corresponding to a desired light distribution.

In the embodiment shown herein, the light-transmissive shield S, between its edge areas B1, B2 has no light deflecting optical characteristics. Depending upon legally-required light distribution and specially required installation positions of the blink lamp in corners of vehicles, possibly no light deflecting elements will be required at the edge areas B1, B2 as well. Depending upon the legally-required light distribution, horizontally light-scattering optical elements can be arranged to extend vertically in the front edge area B1 which divert light contacting these optical elements toward a middle axis of the vehicle. This front edge area B1 has a very small width and is limited to have few light scattering optical elements. In FIG. 1 are shown, for example, four optical elements E. In other embodiments two to ten optical elements E can be arranged on an interior side of the light-transmissive shield.

In a further embodiment, the light-transmissive shield S has, at its rear edge area B2 a rearward-illumination, or reflective, optical element RS. This reflective optical element RS can be integrated into the light-transmissive shield S, however, it can also, as is shown in FIG. 1, be arranged as an additional light-transmissive shield in the interior of the blink lamp behind the light-transmissive shield S. An arrangement can also be chosen in which the reflective optical element RS extends to an area near the light source L and is light-transmissive to allow sideward illumination in this case. The light source L can be provided with two filaments whereby a second filament produces a position light via the reflector portions R1, R2.

In the embodiment shown herein the light-transmissive shield S is glass clear and has, at least between its edge areas B1, B2, no light reflection optical elements so that an outside viewer can freely see both reflector portions R1, R2 and the light source L. In order to achieve a necessary legal signal color of the blink lamp when placed in operation, a filter element is arranged between the light-transmissive shield S and the filament of the light source L in this embodiment, which can be formed as a signal-colored lamp bulb, or as a signal-colored light-transmissive shield, which encloses the light source L.

In another embodiment the light-transmissive shield S can also be made to have the signal-color of the blink lamp. The light-transmissive shield S can be thereby manufactured of glass or resinous plastic.

The blink lamp shown in FIG. 1 can also be made as part of a multi chamber rear lamp for motor vehicles or as a front blink lamp for vehicles whose housing is made as one piece with a housing of an adjacently-arranged headlight. In this manner, the blink lamp can be covered by an individually specialized light-transmissive shield S or by one which is constructed as one piece with a light-transmissive shield having other light functions of the headlight or taillight, whereby a particularly uniform outer appearance results.

Figure 2:
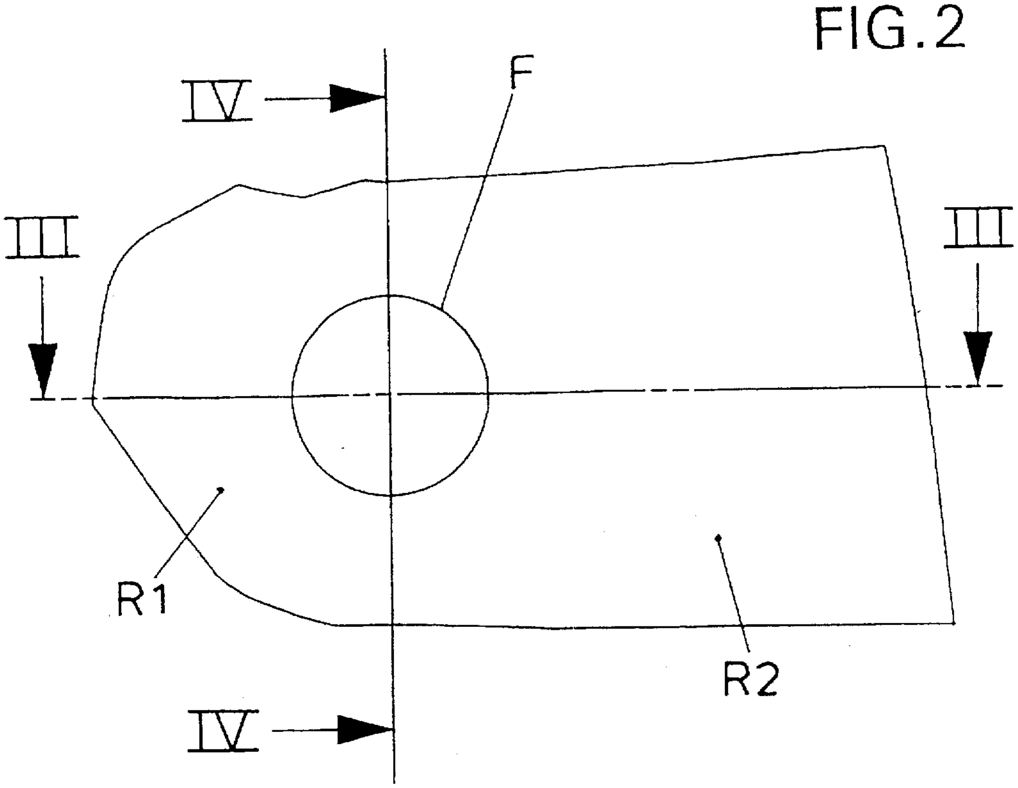
FIG. 2 is a diagram of a projection, or projected image, of reflector portions in a driving direction of an exemplary reflector of this invention.

FIG. 2 shows a project ion of the reflector portions R1, R2 in the driving direction of a blink lamp, such as the one shown and described in FIG. 1, however, with a different size distribution. In this projection of the reflector portions R1, R2 it can be recognized that the inner second reflector portion R2 is larger than the outer first reflector portion R1. The socket F is arranged between the reflector portions R1, R2. A dividing line between the reflector portions R1, R2 can extend strictly vertically. It can, however, depending upon the installation situation of the blink lamp, extend tending towards the vertical or along a crooked line.

Figure 3:
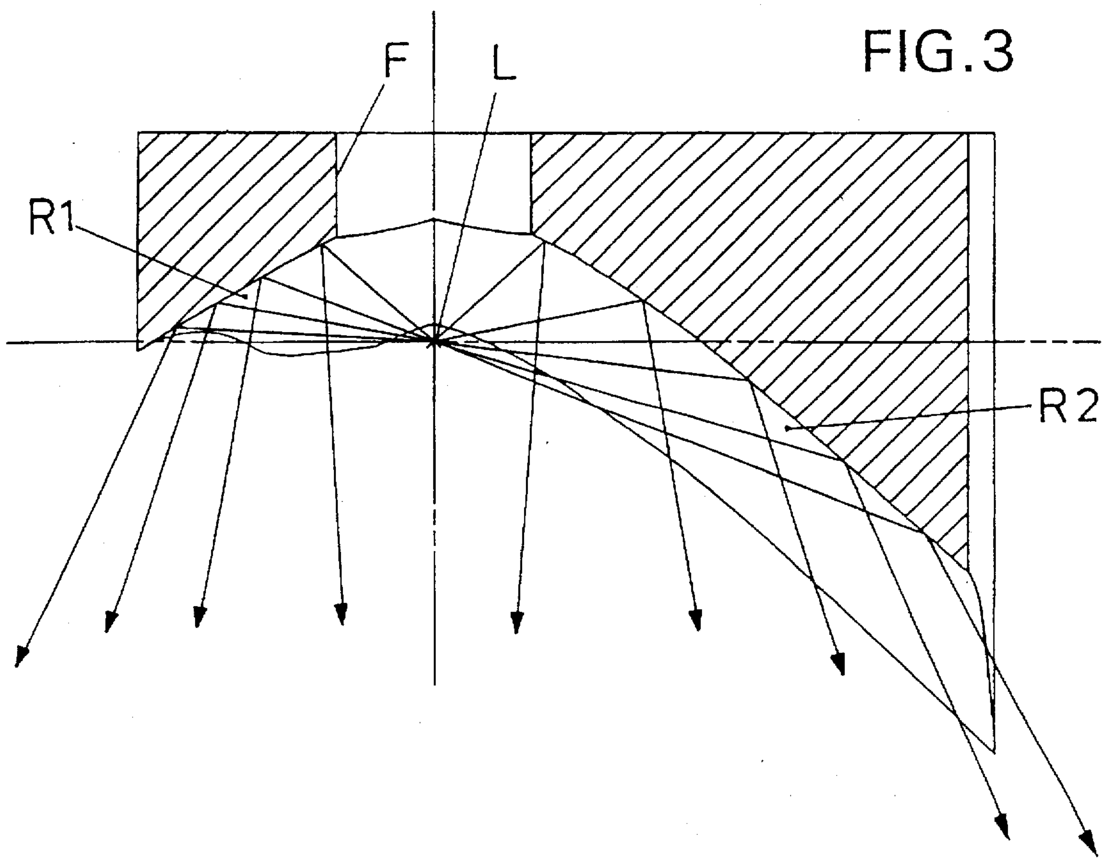
FIG. 3 is a horizontal cross sectional view taken on line III—III in FIG. 2, with light beams being shown thereon.

FIG. 3 shows a horizontal cross section taken on line III—III in FIG. 2 of a reflector of this invention with two reflector portions R1, R2. The surface of both reflector portions R1, R2 are formed such that the light reflected directions of the light beams originating from the light source L change continuously as a function of the geometric position on the surfaces of the reflector portions from which they are reflected. The outer first reflector portion R1 has, in this horizontal cross section, a parabolic-like defocused reflection characteristic so that a diverging light bundle is created. The light beams emitted from the filament of the light source L are, however, thereby, in contrast to a parabolic-like defocused reflection characteristic, upon being reflected from the surface of the outer first reflector portion R1, not all deflected outwardly, but rather, a created light bundle has a light scattering, which corresponds to a desired horizontal light distribution. The inner second reflector portion R2 has, in this horizontal cross section, likewise a parabolic-like defocusing reflection characteristic so that it also produces a diverging light beam bundle, as is already described for the outer first reflector portion R1. The diverging light beam bundle thereby creates the same horizontal light distribution as the light beam bundle of the outer first reflector portion R1. In contrast to a parabolic-like defocused reflection characteristic, no individual separately functioning light beam bundle will be created by each of the reflector portions, rather, both light beam bundles have the same light distribution and complement one another in their light intensity, whereby a maximum light use and an optimal light distribution is brought about.

Figure 4:
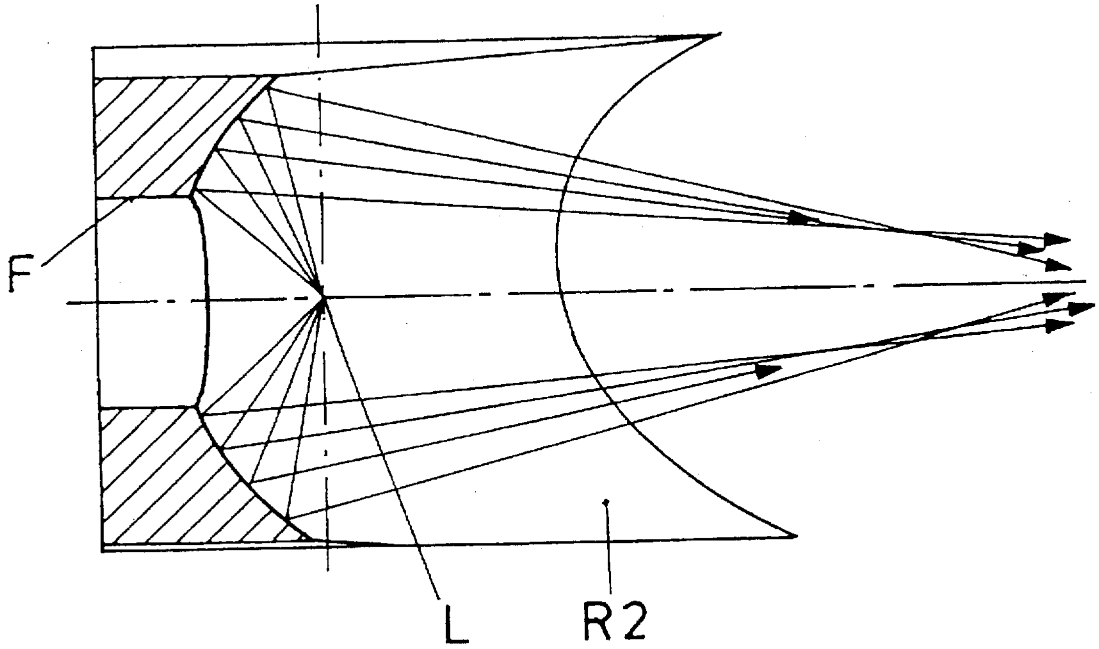
FIG. 4 is a vertical cross sectional view taken on line IV—IV in FIG. 2, with light beams being shown thereon.

FIG. 4 shows a vertical cross section IV—IV taken in FIG. 2, in which both reflector portions R1, R2, in this vertical section, have an elliptical-like reflection characteristic so that a converging light beam bundle from each of the reflector portions R1, R2 is created. Also in this example, the reflection direction of light beams emitted by the light source continually change with changes in the geometrical position on the surface of the reflector portions R1, R2. In FIG. 4 only the inner second reflector portion R2 and the socket F are shown. Because a light scattering reflection characteristic relative to a desired light distribution in a vertical cross-sectional direction is created by intersecting light beams in front of the light source L, it is possible to arrange the reflector far in a rear area of the blink lamp without having the reflected light beams reflected on upper and lower bordering walls of the blink lamp so that no undesired scattered light is emitted and these wall areas of the blink lamp can be freely formed.

Figure 5:
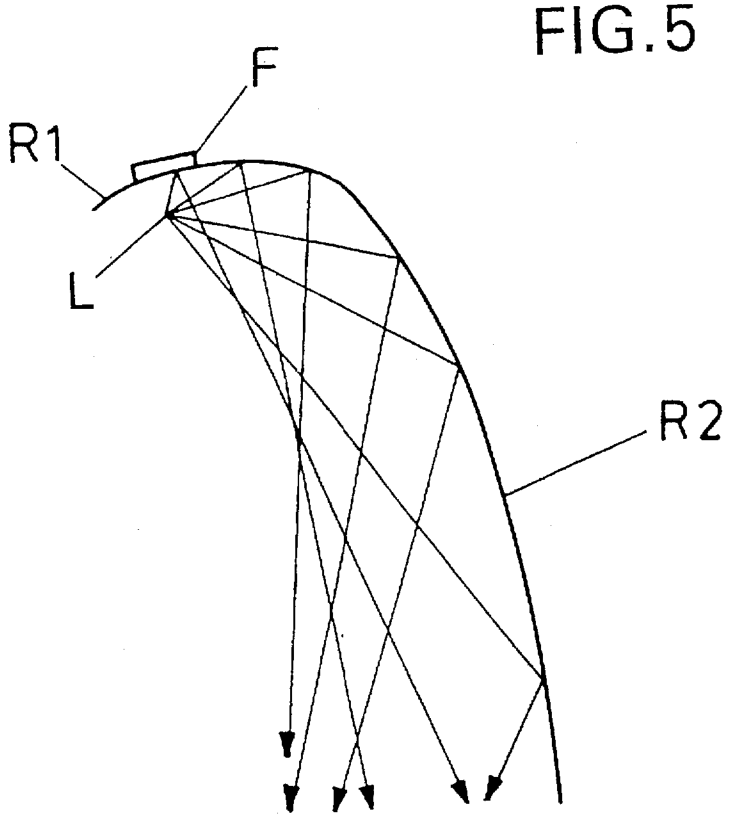
FIG. 5 is a fragmented horizontal sectional view taken of a second reflector embodiment of this invention, with light beams being diagrammatically shown thereon for an inner second reflector portion.

FIG. 5 shows a horizontal cross section taken of the reflector portions R1, R2 of a blink lamp in which an inner second reflector portion R2 has a different reflection characteristic than those in the embodiments of FIGS. 2 and 3. In this embodiment the inner second reflection portion R2 extends preferably far toward a front area of a light-transmissive shield S (which is not shown here). For light beams emitted from the light source L, in this embodiment the second reflector portion R2 has, in horizontal cross section, an elliptical-like reflection characteristic, similar to that described for the embodiment of FIG. 4, so that a converging light beam bundle is created. Because a necessary horizontal light deflection is larger than a necessary vertical light deflection, the intersecting light beams scatter to a greater extent than, for example is shown in FIG. 4. Lines of intersection of two adjacent reflected light beams lie further from the socket F with increasing spacing, on the surface of the second reflector portion R2, from the socket F. Also in this manner, as in the embodiment of FIG. 4, it is possible for the reflector portions R1, R2 of the blink lamp to be located far toward the rear, without light beams reflected by the inner second reflector portion R2 being scattered by a wall of the housing of the blink lamp. This provides the advantageous result of a best possible use of light.

Figure 6:
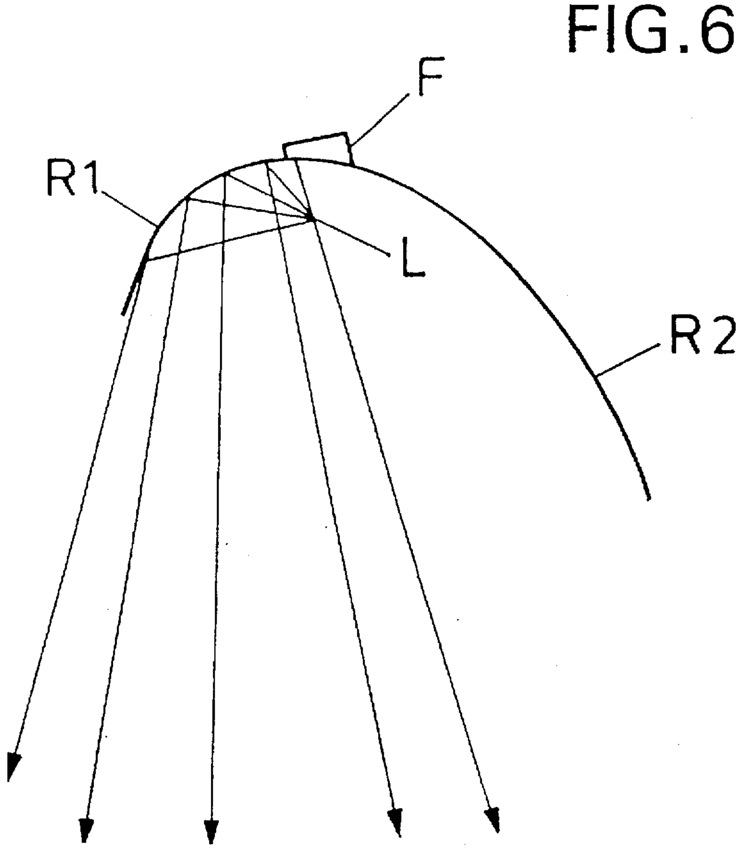
FIG. 6 is a fragmented horizontal cross sectional view taken of the reflector of FIG. 5 with light beams being diagrammatically represented thereon for the outer first reflector portion.

In addition to the light reflection characteristic of the inner second reflector portion R2 shown in FIG. 5, a same type of horizontal cross section is provided in FIG. 6 as an example of the reflection characteristics of the outer first reflector portion R1. This reflection characteristic, which in a horizontal cut is parabolic-like defocused and thereby creates a diverging light beam bundle, corresponds with the reflection characteristics of the outer first reflector portion R1 described for the embodiment of FIG. 3. The light source L, the socket F, and the inner second reflector portion R2 are only shown schematically in FIG. 6.

Figure 7:
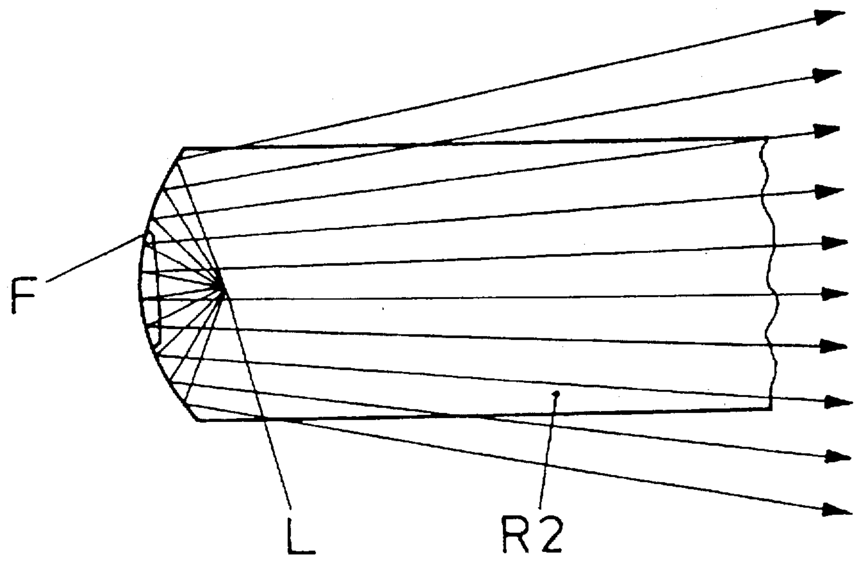
FIG. 7 is a vertical cross section taken through the reflector of FIGS. 5 and 6 with light beams being diagrammatically shown thereon.

FIG. 7 shows a vertical cut through a vertical reflector arrangement with reflector portions R1, R2 in which, in this representation, only an inner second reflector portion R2 can be seen. Both reflector portions R1, R2 can thereby have the same reflection characteristics, however, the reflection characteristics can also be different. The reflection characteristics shown in FIG. 7, in contrast to those shown and described with reference to FIG. 4, have a parabolic-like defocusing reflection characteristic so that a diverging light beam bundle is created. The creation of this light beam bundle results as is described for the horizontal cut of FIG. 3. In FIG. 7 are shown, as in FIGS. 3 through 6, representative light beam paths of light emitted by the light source and reflected from the reflection portions R1, R2. Additionally, examples of the socket F and light source L are shown in FIG. 7.

FIG. 8 depicts an example of a desired average light distribution. The light distribution must be achieved on a projection screen spaced at a predetermined spacing in front of the blink lamp. According to national legal requirements, the desired light distribution will vary. As mentioned above, the light distribution of FIG. 8 concerns an average light distribution whose numerical values are given in percentages. The horizontal angle thereby varies between minus 30 degrees and plus 30 degrees. The light values given for the horizontal area thereby lie between minus 20 degrees and plus 20 degrees. A vertical angle of the light distribution varies between minus 15 degrees and plus 15 degrees, whereby the created light values vary between minus 10 degrees and plus 10 degrees. As can be recognized, a substantially rectangularly-shaped light distribution is created whose horizontal extension is greater than its vertical extension. The light distribution is further concentrated in the center. The highest light values lie respectively at 0 degrees and decrease from the 0-degree-axis in both the vertical and also horizontal direction outwardly.

In the embodiments described in FIGS. 1 through 7, each reflector portion R1, R2 creates by itself the light distribution which is shown here as an example, whereby the light intensities supplement one another. Depending upon the size relationships of the individual reflector portions R1, R2 the light intensities of the individual reflector portions R1, R2 can have differences. In that both reflector portions R1, R2 create the same light distribution, whereby the light intensities are complementary to, or supplement, one another, the best possible light distribution is achieved and a maximized usage of light is made possible.

It is beneficial that the reflector portions are formed together as one piece and that the surfaces of the reflector portions run continuously, flush, together because in addition to allowing an uncomplicated and cost-effective manufacture of the blink lamp it particularly makes the best usage possible of available light beams. A particular benefit results if the light-transmissive shield does not have any optical light deflecting elements and the reflector can be seen from outside because a partition of the reflector, or a step between reflector parts, would disturb visual appearance.

It is beneficial that, upon projection of the reflector portions in a driving direction, that the inner second reflector portion is at least as large as the outer first reflector portion and that the surfaces of both reflector portions are formed such that the reflection directions continually change with changes in the geometrical positions on the surfaces because in this manner the blink lamp can be manufactured in an uncomplicated and cost-effective manner, does not require optical elements in the light-transmissive shield, and makes possible an optimal use of available light emitted from the light source.

In this connection, it has proven to be particularly beneficial that both reflector portions produce the same light distribution in that both reflector portions, in horizontal as well as in vertical cuts, have a light scattering reflecting characteristic corresponding to a desired light distribution, because in this manner, in a predetermined installation of the lamp, a best possible usage of available light can be achieved, a particularly beneficial division of the reflector portions is made possible, and by means of the complementing illumination intensities provided by both of the reflector portions, a necessary light distribution can be achieved to the best possible extent without the use of optical light scattering elements in the light-transmissive shield.

While the invention has been particularly shown and described with reference to a preferred embodiment, it will be understood by those of ordinary skill in the art that various changes in form and detail may be made therein without departing from the spirit and scope of the invention.

The embodiments of the invention in which an exclusive property or privilege are claimed are defined as follows:

1. Blink lamp for a motor vehicle, which is arranged at a corner area of a vehicle, said blink lamp having a reflector with an outer first reflector portion (R1), said outer first reflector portion directed toward a side area of the motor vehicle, and an inner second reflector portion (R2), said inner second reflector portion directed toward a longitudinal center line of the motor vehicle; having a light source (L) whose socket is arranged between the first and second reflector portions (R1, R2); and having a light-transmissive shield (S) covering a facing side of the lamp for extending substantially across a driving direction of the motor vehicle and along the side area of the motor vehicle and a free end of the outer first reflector portion (R1) is bordered by the light-transmissive shield (S), wherein:

the first and second reflector portions (R1, R2) are formed together as one piece and have reflector surfaces which run continuously together;

a projection of the inner second reflector portion (R2) in the driving direction is at least as large as a projection of the outer first reflector portion (R1);

reflector surfaces of both the first and second reflector portions are formed so that light beams, which originated from the light source and are reflected on these reflector surfaces, are reflected in a light reflection direction which continuously changes as a function of changes in geometric positions on the reflector surfaces from which the light beams are reflected, so that as light from the light source strikes the surfaces of the reflector portions at different geometric positions, directions in which they are reflected vary, and both the first and second reflector portions (R1, R2) create substantially a same light distribution, with both of the first and second reflector portions (R1, R2), in both horizontal as well as vertical cross sectional directions, having a light scattering reflective characteristic substantially corresponding to the light distribution.

2. Blink lamp as in claim 1 wherein the outer first reflector portion (R1), in the horizontal cross-sectional direction, has a parabolic-like defocused reflection characteristic and a diverging light beam bundle is created.

3. Blink lamp as in claim 2 wherein both reflector portions (R1, R2), in a vertical plane, have an elliptical-like reflection characteristic, and a converging beam bundle is created.

4. Blink lamp as in claim 3 wherein the inner second reflector portion (R2), in a horizontal plane, has a parabolic-like defocused reflection characteristic, and a converging light beam bundle is created.

5. Blink lamp as in claim 3 wherein the inner second reflector portion (R2), in a horizontal plane, has an elliptical-like reflection characteristic, and a converging light beam bundle is created.

6. Blink lamp as in claim 2 wherein both the outer first and inner second reflector portions (R1, R2), in a vertical-cross-sectional direction, have a parabolic-like defocused reflection characteristic and a diverging beam bundle is created.

7. Blink lamp as in claim 6 wherein the inner second reflector portion (R2), in a horizontal plane, has a parabolic-like defocused reflection characteristic and a diverging light beam bundle is created.

8. Blink lamp as in claim 6 wherein the inner second reflector portion (R2), in a horizontal plane, has an elliptical-like reflection characteristic, and a converging light beam bundle is created.

9. Blink lamp as in claim 8 wherein intersecting points of adjacent reflected light beams reflected from the reflector surface of the inner second reflector portion (R2) at increased distances from the socket (F) are spaced further from the socket (F).

10. Blink lamp as in claim 1 wherein the light-transmissive shield (S) between its edge portions (B1, B2) has substantially no light deflection elements.

11. Blink lamp as in claim 1 wherein the light-transmissive shield (S) only has vertically extending horizontally-scattering optical elements (E) at a front edge area (B1) directed toward the longitudinal center line of the motor vehicle, and has substantially no light deflection elements spaced from this front edge area.

12. Blink lamp as in claim 1 wherein the light-transmissive shield (S) has a reflective optical element (RS) in a rear edge area (B2) directed toward a rear of the motor vehicle.

13. Blink lamp as in claim 12 wherein the reflective optical element (RS) is formed as an additional and separate structural member, separate from other members of the transmissive shield.

14. Blink lamp as in claim 1 wherein the light-transmissive shield is glass clear and light filter material is arranged between a filament of the light source (L) and the light-transmissive shield (S).

* * * * *